United States Patent Office 3,402,134
Patented Sept. 17, 1968

3,402,134
TRI AND TETRA MERCAPTO COMPOUNDS AS CROSS-LINK CONTROL AGENTS FOR POLYSULFIDE ELASTOMERS
Morris B. Berenbaum, Levittown, and Julian R. Panek, Newtown, Pa., and Louis Citarel, Trenton, N.J., assignors to Thiokol Chemical Corporation, Bristol, Pa., a corporation of Delaware
No Drawing. Filed Apr. 27, 1964, Ser. No. 362,934
13 Claims. (Cl. 260—18)

ABSTRACT OF THE DISCLOSURE

Organic compounds having a plurality of mercaptan groups are used as crosslink control agents in curable compositions based on mercaptan terminated polysulfide polymers.

The present invention relates to improved, curable polysulfide polymer based compositions which contain polymercaptan crosslink control agents, to a method for the cure of such compositions and to the novel vulcanizates that are thereby obtained, which vulcanizates are elastomers having controlled crosslink dependent properties.

An object of this invention is to provide novel, curable polysulfide polymer based compositions which may be cured to elastomers having controlled crosslink dependent properties.

Another object of this invention is to provide a novel method for the preparation of elastomeric polysulfide polymer based vulcanizates which have controlled crosslink dependent properties.

A further object of this invention is to provide novel, elastomeric polysulfide polymer based vulcanizates which have controlled crosslink dependent properties.

Polysulfide polymers of the type disclosed in the Patrick and Ferguson Patent U.S. 2,466,963, are well known in the art and have been extensively used for a variety of commercial applications. When cured to form rubberlike solids, they possess a number of commercially important properties. The cured polymers are inert to oil, most solvents, water and mild acids and alkalies, as well as to ozone and sunlight. They are tough, and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties, they have been extensively used in impregnating, sealing, caulking and coating compositions, as well as, for a variety of special uses such as gasoline hose, printer's rolls and potting compounds for electrical components.

The more preferable polysulfide polymers, from a commercial point of view, are characterized by the fact that they are liquid materials at room temperature which have recurring polysulfide linkages between organic radicals having at least two primary carbon atoms for connection to the disulfide linkages. These polymers, thus, have a general structure corresponding to the formula

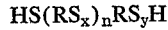

HS(RS$_x$)$_n$RS$_y$H in which $x$ is a number of about 1.6 to 5, $y$ is a whole number fromm 1 to 2, the R's are organic radicals, preferably, predominantly divalent aliphatic radicals such as alkylene, oxahydrocarbon, and thiahydrocarbon radicals, and $n$ is an integer which may vary from about 4 to 80. These polysulfide polymers are preferably formed by the reaction of an organic halide such as ethylene dichloride and an inorganic polysulfide such as sodium polysulfide in the presence of a relatively minor amount of a material such as trichloropropane with a subsequent splitting of the resulting solid polymer to form liquid polymers as described in the Patrick and Ferguson Patent, U.S. 2,466,963. While it is thus possible to impart minor degrees of crosslinking by the method taught by Patrick and Ferguson to help in some degree to control such crosslink dependent properties as elastic modulus, compression set and ultimate elongation in the cured elastomer, the Patrick and Ferguson method cannot provide the degree of flexibility needed to control the crosslink dependent properties of polysulfide polymer vulcanizates that is demanded by the requirements of present day usage. For example, where relatively low molecular weight liquid polysulfide polymers, that is those having molecular weights of about 500 to 2,000, are used to prepare printer's rolls, although they may contain as much as 2% crosslink as provided by the Patrick and Ferguson method, nonetheless, upon cure they provide vulcanizates which have a tendency to have excessive degrees of compression set, even at ambient temperatures. However, were the amount of crosslink increased beyond 2% by the method of Patrick and Ferguson, upon cure the polymers would lose muct of their otherwise high resistance to tear that is believed to be needed to fabricate smooth printer's rolls. Another deficiency of the prior art polysulfide polymer based compositions lies in the inability of the fabricator to change or "tailor-make" the degree of crosslink in the vulcanizate so as to suit any particular end use requirement. The fabricator is thus forced to stock, purchase, or prepare liquid polysulfide polymers having various degrees of crosslink to suit his needs. Even this may not prove adequate, in that, as was previously pointed out in the case of printer's rolls, it may not be possible to prepare a liquid polysulfide polymer which has all of the desired qualities of molecular weight, tear resistance and degree of crosslink needed to attain all the desired properties in the end product. The Patrick and Ferguson method, therefore, is not adequate to provide polymers which can be used in polysulfide polymer based compositions to readily give those in the art, the degree of control of crosslink dependent properties that is presently needed by those in the art.

It has now been unexpectedly found according to the present invention, that the objects of the present invention may be attained and the deficiencies of prior art compositions with respect to control of crosslink dependent properties may be remedied if there is incorporated in such compositions, prior to the cure thereof, about 0.05 to 20 parts by weight of one or more polymercaptan crosslink agents of the type R'(SH)$_m$ wherein $m$ is a whole number of 3 or 4, and R' is an organic radical that is inert with respect to reaction with mercaptan groups, such alkyl or aryl hydrocarbon, ether, polyether, ester, polyester, amide or similarly inert radicals, per one hundred parts by weight of the liquid polysulfide polymer in such compositions. The resulting compositions which also contain suitable quantities of curing agents, may then be cured at temperatures of about 65° F. to 300° F. to produce novel elastomeric vulcanizates having selected crosslink dependent properties. The polymercaptan crosslink agents found useful in the practice of the present invention may effectively be used with the liquid polysulfide polymers which previously have been prepared with no crosslink or with up to 4% crosslink. The amount of any specific polymercaptan crosslink agent to be used in the formulation of a curable polysulfide polymer based composition for any specific end use is dependent upon the type and extent of control needed over the crosslink dependent properties of the vulcanizate. In general, trimercaptan crosslink agents will provide a smaller degree of crosslink control per mole used than the corresponding tetramercaptan crosslink agents. The precise reasons for crosslink control by the polymercaptan crosslink agents used according to the teachings of the present invention are not wholly known. In any event, regardless of the actual reaction mechanism, the use of these crosslink control agents in curable polysulfide polymer based compositions will provide novel elastomeric vulcanizates having controlled crosslinked dependent properties. Exemplary of the polymercaptan crosslink agents which may be used according to the present invention are the tris-thioglycolates, and tris-3-mercaptopropionates of trimethylolpropane and trimethylolethane and the tetrakisthioglycolate, and tetrakis-3-mercapto-propionate of pentaerythritol. Tetramercaptobutane and other tetramercaptoalkanes are also useful crosslink control agents in accordance with the teachings of the present invention.

Various curing agents have proved useful in the curing of polysulfide polymers. Thus, for example, metal oxide curing agents for liquid polysulfide polymers have been suggested in the aforementioned patent to Patrick and Ferguson and in the Patrick Patents U.S. 2,195,380 and 2,206,643. Further, the use of aryl and alkaryl nitro compounds as curing agents for curable polysulfide polymers has been proposed by Patrick in U.S. 2,195,380 and 2,206,643. Rosenthal in U.S. 2,940,959 used dinitrobenzene and trinitrobenzene with manganite-coated manganese dioxide curing agent to vulcanize relatively low molecular weight, that is, about 1000, polysulfide polymers. Other inorganic curing agents include $TeO_2$, $SeO_2$, $Sb_2O_3$, $CaO_2$, $MgO_2$, and $PbO_2$. Other curing agents including organic materials which may be used are polyepoxides (see for example U.S. 2,789,958), peroxides such as cumene hydroperoxide, aziridine compounds and other nitrogen containing compounds.

All of the aforementioned curing agents may be used in the practice of the present invention. The amount of curing agent to be used varies depending upon the polymer, the curing agent and the application. Effective amounts will range from about 1 to 200 parts by weight per 100 parts by weight of polymer. The novel compositions of the present invention may also include adjuvant materials commonly employed in the polysulfide arts. Such materials would include fillers, pigments and reinforcement agents such as the clay materials which would include bentonite, titanium dioxide, barium sulfate, carbon black, silica, zinc carbonate, zinc sulfide, magnesium silicate, calcium carbonate, calcium silicate, calcium sulfate, diatomaceous earth, iron oxide, magnesium silicate and zinc oxide. The compositions might also include cure regulators such as the fatty acids, such as stearic acid and oleic acid, ammonium salts, nitro compounds, such as dinitrobenzene, trinitrobenzene, orthonitroanisole, alums, amines, alkali metal oxides, and hydroxides.

The plasticizers which may be used in the composition of the present invention are any of those which are compatible with polysulfide rubbers. These plasticizers include materials such as pine tar, soy bean oil and soy bean oil vulcanized with rubber maker's sulfur, calcium stearate, dibutyl phthalate, phenyl cresyl phthalate, phenyl benzyl phthalate, butyl benzyl phthalate, dibutyl phenyl phosphate, tricresyl phosphate, butyl cyclohexyl phthalate, triphenyl phosphate, dibutyl phthalate, phenyl dicresyl phosphate, isooctyl diphenyl phosphate, di-2-ethylhexyl phenyl phosphate, diphenyl phthalate, dipropylene glycol dibenzoate, dibenzyl adipate, isodecyl diphenyl phosphate, isodecyl dicresyl phosphate, (butyl octyl) phosphate, tri-n-hexyl phosphate, butyl decyl phthalate, diisooctyl phthalate, di-2-ethylhexyl phthalate, di-n-octyl phthalate, di-n-octyl phenyl phosphate, di-2-ethylhexyl isophthalate, dibutoxyethyl adipate, dicapryl phthalate, diisodecyl phthalate, di-2-ethylhexyl hexahydrophthalate, di-n-nonyl phthalate, di-2-ethylhexyl terephthalate, hydrogenated terphenyl, di-n-decyl phthalate, dioctyl adipate, di-2-ethylhexyl azelate, alkyl aromatic hydrocarbons, ditridecyl phthalate, di-2-ethylhexyl sebacate, diisodecyl adipate, di-n-decyl adipate, dibutyl carbitol formal, dibutyl carbitol adipate, and castor oil, diethyl phthalate, ethyl phthalyl ethyl glycolate, dicyclohexyl phthalate, epoxized linseed oil, chlorinated biphenyls, coal tars, coumarone-indene resins and coumarone-indene resin/coal tar polymers, dibutoxyethoxy ethyl adipate, dibutoxyethoxy ethyl formate, terphenyl compounds, Vaseline, aromatic petroleum hydrocarbons and polymerized aromatic petroleum resins and aromatic hydrocarbon oils.

Where an outside curing agent such as manganese dioxide or tellurium dioxide is used as the curing agent in one of the curing compositions of the present invention, it is sometimes advisable for cure stabilization purposes to use in such compositions a cure stabilizing system composed of 0.005 to 1 part by weight of copper in the form of a polar solvent soluble copper salt and 0.01 to 10 parts by weight of polar solvent. Such polar solvents would include water and lower alkanols and ketones having up to 5 carbon atoms. Copper salts which may be used in this respect are cupric acetate, cupric ammonium chloride, cupric bromide and bromate, cupric chloride and chlorate, cupric formate, cupric lactate, cupric nitrate, cupric potassium chloride, cupric salicylate, cupric selenate, cupric silicofluoride, and cupric sulfate, as well as cupric arsenate, cupric acid arsenate, cupric arsenite, cupric carbonate, cupric chromate and dihromate, cupric ferro and ferricyanide, cupric hydroxide, cupric iodate, cupric nitroprusside, cupric oxide, cupric phosphate, cuprous carbonate, cuprous chloride, cuprous cyanide, cuprous ferro and ferricyanide, cuprous hydroxide, cuprous oxide, cuprous sulfide and cuprous thiocyanate.

The curable compositions of this invention are prepared by placing the polysulfide polymers, curing agents, polymercaptan crosslink agents and adjuvants, where the latter may be used, into uniform and intimate admixture, as by mixing by hand, on a paint mill or in an internal mixer. The compositions may be prepared in one effort and at one time by mixing together all the components. They also may be prepared, especially where considerations of considerably long termed storage are paramount, as several partial mixtures of blended components, variously known as two-package or three package compositions. These partial mixtures are then subsequently combined into a blend of all necessary components prior to use. For example, one partial mixture may contain the polysulfide polymers and the polymercaptan crosslink agent, and the other partial mixture, the curing agent in a liquid plasticizer. The adjuvants may conveniently be distributed between the storable partial mixtures. For purposes of long termed storage it is desirable to store the polymers and polymercaptan crosslink agents separate from the curing agents. At the time of use, the component ingredients, whether as separate substances or as premixed partial mixtures, are blended to form a single mixture, and degassed prior to cure.

The novel curing process of this invention may be considered as essentially a two step process which includes as the first step the admixture of at least the necessary component ingredients required to form the curable compositions of the invention. In the second step, the blended curable compositions are cured at temperatures of about 65° C. to 300° F. for about 1 min. to 72 hours to produce the desired vulcanizate.

More detailed illustrations of specific embodiments of the novel curable compositions, the novel cure process and the novel vulcanizates of this invention are presented in the examples. These examples are merely illustrative of the present invention and are not intended as a limitation upon the scope thereof.

In the following examples, an intimate blend of the listed ingredients of the curable compositions was prepared by milling together the polysulfide liquid polymer with the polymercaptan crosslink agent and at least a portion of the other adjuvants as one partial mixture, and by milling together the curing agent in a liquid plasticizer vehicle with perhaps some of the other adjuvants as the second partial mixture, then combining the two partial mixtures by hand mixing at room temperature to form the specific curable composition. The cure time was observed to be that interval of time required, at a specified temperature, to obtain a tack-free elastomeric solid. In general, the compositions were cured to form elastomeric vulcanizates in the form of test sheets. These sheets were then examined for physical property data, such as tensile properties (ASTM D412–51T), hardness (ASTM D676–59T) and compression set (ASTM D395–55).

In Examples 1 to 4, polysulfide liquid polymer A is a polymer having a linear backbone that is essentially HS(C₂H₄OCH₂H₄SS)ₙC₂H₄OCH₂OC₂H₄SH, which was made according to the process of Patrick and Ferguson and which has a molecular weight of about 4,000. Polysulfide liquid polymer A was made with no crosslinking agent, and thus would normally cure in prior art compositions with a nominal zero percent crosslink. In Examples 5 to 13, a blend of two polysulfide liquid polymers, LP–12 polymer and LP–32 polymer, was used. LP–12 polymer is similar to polymer A in all respects except that it has a nominal crosslink of 0.1% provided by trichloropropane. LP–32 polymer is also similar to polymer A in all respects except that its nominal crosslink is 0.5%. The nominal crosslink of the blend is about 0.15%.

It is to be seen in Examples 1 to 13 that the crosslink dependent property "ultimate percent elongation" can be controllably and substantially changed by varying the amount of the polymercaptan crosslink agent used in the various compositions.

In Examples 14 to 21, LP–3 polysulfide liquid polymer was used, which polymer is similar to liquid polymer A except that it has an average molecular weight of about 1,000 and a crosslink of 2% imparted by trichloropropane. These examples show that the use of polymercaptan crosslink agents in the curable compositions provide control over compression set properties of vulcanizates made therewith, and especially when the curing is conducted at ambient temperatures. Such ambient temperature cures usually require several days time. The manganese dioxide used in these examples was Manganese Hydrate No. 37, a substance being 70% MnO₂, 22% water of hydration, 43.8% managanese and 12.5% in available oxygen. The solvent vehicle, Aroclor 1254, is a polychlorinated biphenyl containing 54% chlorine.

| Example | 1 | 2 | 3 | 4 | 5 | 6 | 7 |
|---|---|---|---|---|---|---|---|
| Receipe of Curable Composition, in pbw.: | | | | | | | |
| Polysulfide liquid polymer A | 100 | 100 | 100 | 100 | | | |
| LP–12 Polysulfide liquid polymer | | | | | 75 | 75 | 75 |
| LP–32 Polysulfide liquid polymer | | | | | 25 | 25 | 25 |
| Trimethylolpropane tris(3-mercaptopropionate) | | | | | | | |
| Pentaerythritol tetrakis (3-mercaptopropionate) | 0 | 0.1 | 0.5 | 1.0 | 0 | 0.1 | 0.5 |
| Stearic acid | 1 | 1 | 1 | 1 | 0.5 | 0.5 | 0.5 |
| Semi-reinforcing furnace grade carbon black | 30 | 30 | 30 | 30 | 30 | 30 | 30 |
| PbO₂, 50% in Aroclor 1254 liquid vehicle | 15 | 15 | 15 | 15 | 15 | 15 | 15 |
| Curing Conditions: | | | | | | | |
| Cure interval, in minutes | (¹) | (¹) | (¹) | (¹) | 10 | 10 | 10 |
| Cure temperature, in °F | 80 | 80 | 80 | 80 | 225 | 225 | 225 |
| Vulcanizate Properties: | | | | | | | |
| Tensile strength, in p.s.i | 398 | 418 | 326 | 310 | 125 | 120 | 170 |
| Ultimate elongation, in percent | 970 | 860 | 770 | 560 | >1,100 | 760 | 680 |
| Hardness, in Shore A durometer degrees | 49 | 48 | 51 | 59 | 32 | 33 | 38 |

| Example | 8 | 9 | 10 | 11 | 12 | 13 |
|---|---|---|---|---|---|---|
| Recipe of Curable Composition, in pbw.: | | | | | | |
| Polysulfide liquid polymer A | | | | | | |
| LP–12 Polysulfide liquid polymer | 75 | 75 | 75 | 75 | 75 | 75 |
| LP–32 Polysulfide liquid polymer | 25 | 25 | 25 | 25 | 25 | 25 |
| Trimethylolpropane tris(3-mercaptopropionate) | | | 0.5 | 1.0 | 2.0 | 5.0 |
| Pentaerythritol tetrakis (3-mercaptopropionate) | 1.0 | 5.0 | | | | |
| Stearic acid | 0.5 | 0.5 | 0.5 | 0.5 | 0.5 | 0.5 |
| Semi-reinforcing furnace grade carbon black | 30 | 30 | 30 | 30 | 30 | 30 |
| PbO₂, 50% in Aroclor 1254 liquid vehicle | 15 | 15 | 15 | 15 | 15 | 15 |
| Curing Conditions: | | | | | | |
| Cure interval, in minutes | 10 | 10 | 10 | 10 | 10 | 10 |
| Cure temperature, in °F | 225 | 225 | 225 | 225 | 225 | 225 |
| Vulcanizate Properties: | | | | | | |
| Tensile strength, in p.s.i | 200 | 185 | 205 | 225 | 230 | 195 |
| Ultimate elongation, in percent | 430 | 80 | 920 | 680 | 310 | 125 |
| Hardness, in Shore A durometer degree | 42 | 55 | 38 | 42 | 49 | 52 |

| Example | 14 | 15 | 16 | 17 | 18 | 19 | 20 | 21 ³ |
|---|---|---|---|---|---|---|---|---|
| Recipe of Curable Composition, in pbw.: | | | | | | | | |
| LP–3 Polysulfide liquid polymers | 100 | 100 | 100 | 100 | 100 | 100 | 100 | 100 |
| Trimethylolpropane tris(3-mercaptopropionate) | | | | 1.5 | | | | |
| Trimethylolethane tris(3-mercaptopropionate) | | | | | 1.5 | 4.5 | | |
| Pentaerythritol tetrakis (3-mercaptopropionate) | 1.5 | 4.5 | | | | | | 0.3 |
| MnO₂, 50% in Aroclor 1254 liquid vehicle | 7.5 | 7.5 | 7.5 | 7.5 | 7.5 | 7.5 | | |
| Semi-reinforcing furnace grade carbon black | 45 | 45 | 45 | 45 | 45 | 45 | 30 | 30 |
| Dinitrobenzene | 7.5 | 7.5 | 7.5 | 7.5 | 7.5 | 7.5 | | |
| O-nitroanisole | | | | | | | 12 | 12 |
| Curing Conditions: | | | | | | | | |
| Cure interval, in minutes | (¹) | (¹) | (¹) | (¹) | (¹) | (¹) | (¹) | (¹) |
| Cure temperature, in °F | 80 | 80 | 80 | 80 | 80 | 80 | 80 | 80 |
| Vulcanizate Property: | | | | | | | | |
| Compression set, at 80° F., in percent | 9 | 4 | 10 | 13 | 8 | 25 | (²) | 1.8 |
| Compression set, at 158° F., in percent | 95 | 43 | 100 | 100 | 87 | 100 | (²) | 40 |

¹ Not measured.   ² No cure.   ³ 0.17 pbw. of Duponol L–144–WD G, a sodium salt of a modified unsaturated long chain alcohol sulfate was added to the recipe prior to cure.

We claim:

1. A curable polysulfide composition capable of being vulcanized and consisting essentially of
   (a) a curable low molecular weight polysulfide polymer in which the main polymer chain essentially conforms to the formula $$HS(RS_x)_nRS_yH$$

where R represents a divalent organic radical selected from the group consisting of alkylene, oxahydrocarbon and thiahydrocarbon divalent radicals, $x$ is a number of about 1.6 to 5, $y$ is a whole number from 1 to 2, and $n$ is a whole number from about 4 to 80,
   (b) and from about 0.05 to 20 parts by weight, per 100 parts by weight of the polysulfide polymer contained in the curable composition, of a crosslink control agent of the group consisting of tris-thioglycolates, tris-3-mercaptopropionates of trimethylolalkanes, tetrakisthioglycolates and tetrakis-3-mercaptopropionate of pentaerythritol.

2. A composition as in claim 1 which further comprises at least one cure rate regulator.

3. A composition as in claim 2 in which said cure rate regulator is selected from the group consisting of fatty acids, dinitrobenzene, and orthonitroanisole.

4. A composition as in claim 3 in which said cure rate regulator is a fatty acid.

5. A composition as in claim 4 in which said cure rate regulator is stearic acid.

6. A composition as in claim 3 in which said cure rate regulator is dinitrobenzene.

7. A composition as in claim 3 in which said cure rate regulator is orthonitroanisole.

8. A composition as in claim 1 which further comprises a curing agent for said polysulfide polymer.

9. A composition as in claim 8 in which said curing agent is at least one metal oxide.

10. A composition as in claim 9 in which said curing agent is Manganese dioxide.

11. A composition as in claim 9 in which said curing agent is lead dioxide.

12. A composition as in claim 2 which further comprises a curing agent for said polysulfide polymer.

13. A composition as in claim 1 in which said curing agent is a metal oxide.

References Cited

UNITED STATES PATENTS

| | | | |
|---|---|---|---|
| 2,466,963 | 4/1949 | Patrick et al. | 260—79.1 |
| 2,631,994 | 3/1953 | Grotenhuis | 260—79.1 |
| 2,919,262 | 12/1959 | Nummy | 260—79.1 |
| 3,144,422 | 8/1964 | Homberg | 260—23 |
| 3,282,902 | 11/1966 | Panek | 260—79.1 |

DONALD E. CZAJA, *Primary Examiner.*

C. W. IVY, *Assistant Examiner.*